United States Patent
Chen

[19]

[11] Patent Number: 5,980,167
[45] Date of Patent: Nov. 9, 1999

[54] TABLE FENCE ASSEMBLY OF DRILL PRESS CAPABLE OF FACILITATING ACCURATE DRILLING ON WORKPIECE

[76] Inventor: Ruey-Zon Chen, No. 261, Jen Hua Road, Ta Li City, Taichung Hsien, Taiwan

[21] Appl. No.: 09/054,512

[22] Filed: Apr. 3, 1998

[51] Int. Cl.[6] ................................................ B23B 47/00
[52] U.S. Cl. .................... 408/87; 408/91; 144/253.2
[58] Field of Search ..................... 408/72 R, 87, 408/91, 97, 103; 144/253.1, 253.2, 253.6

[56] References Cited

U.S. PATENT DOCUMENTS

| | | | |
|---|---|---|---|
| 2,543,917 | 3/1951 | Lloyd | 408/91 |
| 2,747,441 | 5/1956 | Johnson et al. | 408/91 |
| 3,222,052 | 12/1965 | Freda | 408/91 |
| 5,042,542 | 8/1991 | Purviance | 144/253.2 |
| 5,403,129 | 4/1995 | Steussy | 408/87 |
| 5,765,273 | 6/1998 | Mora et al. | 408/87 |

FOREIGN PATENT DOCUMENTS

| | | | |
|---|---|---|---|
| 119155 | 7/1947 | Sweden | 408/87 |

*Primary Examiner*—Daniel W. Howell
*Attorney, Agent, or Firm*—Bacon & Thomas

[57] ABSTRACT

The table fence assembly comprises a rear fence, a front, and a plurality of locking bolts and locking nuts. The rear fence has a L-shaped cross section that includes a horizontal section and a vertical section. The sections are each provided with an elongated hole. The front face also has an L-shape cross section that defines a connecting section and a supporting section. The supporting section is provided with an opening for applying a fastener thereto.

1 Claim, 4 Drawing Sheets

5,980,167

TABLE FENCE ASSEMBLY OF DRILL PRESS CAPABLE OF FACILITATING ACCURATE DRILLING ON WORKPIECE

FIELD OF THE INVENTION

The present invention relates to a table fence assembly, more particularly, to a table fence assembly of a drill press that is capable of facilitating accurate drilling on a workpiece. The table fence assembly can be installed onto a table of a drill press. The drill press includes a column in which the table is rotationally attached hereof through a table locking clamp for left or right adjustment thereof. The table includes a plurality of retaining grooves. The table fence comprises a rear fence having an L-shape cross section that defines a horizontal section and a vertical section. The sections are each provided with an elongate hole, respectively. Wherein the rear fence can be attached to the retaining grooves of the table by means of a plurality of locking bolts and nuts that pass through the elongate hole of the horizontal section and the retaining groove of the table. And a front fence that also has an L-shape cross section defining a connecting section and a supporting section. The supporting section is provided with an opening. Wherein the front fence can be attached to the vertical section of the rear fence by means of at least a locking bolt and nut that passes through the opening of the connecting section and the elongate hole of the vertical section of the rear fence. In drilling a bore on the workpiece the workpiece is firstly marked with a pilot recess by means of a puncher. Then the workpiece is disposed onto the table such that the referring plane of the workpiece is in contact with the vertical section of the rear fence and supporting section of the front fence. Then the tip of the drill bit is lowered down to make sure the tip of the drill bit is aligned with the pilot recess of the workpiece. If the tip of the drill bit is offset frown the pilot recess the table can be moved left or right by means of the table locking clamp till the tip of the drill bit is completely aligned with the pilot recess. Then the drilling process can be commenced By this arrangement, when another workpiece is to drill at the same location, the marking process for the pilot recess can be eliminated. When the workpiece is accurately supported by the vertical section of the rear fence and the supporting section of the front fence, the bore can be accurately and quickly drilled The safety of the operator can be also ensured

DESCRIPTION OF THE PRIOR ART

The drill press is basic machinery that can perform a machining process, such as drilling or boring, on a workpiece. Some drill press may even perform a tapping on the bore of the workpiece. The primary step of the machining process is to drill a pilot bore on the workpiece. Nevertheless, the accuracy of the position of the bore depends considerably on the fixture that is used to fixedly retain the workpiece. However, this bulky and complicate fixture is only for mass production. This is not suitable the drill press for home or personal use.

In order to drill a bore accurately, the central point or recess of the bore shall be firstly marked through a puncher that has a sharp tip. If this pilot point or recess is not accurately marked or offset from the intended position the post machining will also become inaccuracy. In worse condition, the whole workpiece will be discarded. This is a great loss on both labor hours and material.

On the other hand, when the drill bit drills a bore on the workpiece, a great rotational force will be imposed onto the workpiece. If this workpiece is not firmly held or only held manually, the workpiece will be moved from its original position and the whole drilling will be negatively effected. If this is the case, not only will the hand of the operator be possibly injured by the drill bit but also will the workpiece become defective as the bore is inaccurate. This will cause a loss on both labor hours and material. However, this is frequently happened to the conventional drill fence.

SUMMARY OF THE INVENTION

It is the object of this invention to provide a table fence assembly with which the drilling on a workpiece can be accurately performed.

In order to achieve the objective set forth, the table fence assembly for drill press of the type that can be installed onto a table of a drill press is provided. The drill press includes a column in which the table is rotationally attached thereof through a table locking clamp for left or right adjustment thereof. The table includes a plurality of retaining grooves. The table fence comprises a rear fence having an L-shape cross section that defines a horizontal section and a vertical section. The sections are each provided with an elongate hole, respectively. Wherein the rear fence can be attached to the retaining grooves of the table by means of a plurality of locking bolts and nuts that pass through the elongate hole of the horizontal section and the retaining groove of the table. And a front fence that also has an L-shape cross section defining a connecting section and a supporting section. The supporting section is provided with an opening. Wherein the front fence can be attached to the vertical section of the rear fence by means of at least a locking bolt and nut that passes through the opening of the connecting section and the elongate hole of the vertical section of the rear fence.

In drilling a bore on the workpiece the workpiece is firstly marked with a pilot recess by means of a puncher. Then the workpiece is disposed onto the table such that the referring plane of the workpiece is in contact with the vertical section of the rear fence and supporting section of the front fence. Then the tip of the drill bit is lowered down to make sure the tip of the drill bit is aligned with the pilot recess of the workpiece. If the tip of the drill bit is offset from the pilot recess, the table can be moved left or right by means of the table locking clamp till the tip of the drill bit is completely aligned with the pilot recess. Then the drilling process can be commenced By this arrangement, when another workpiece is to drill at the same location, the marking process for the pilot recess can be eliminated. When the workpiece is accurately supported by the vertical section of the rear fence and the supporting section of the front fence, the bore can be accurately and quickly drilled. The safety of the operator can be also ensured.

According to another aspect of the present invention by the provision of the vertical section of the rear fence and the supporting section of the front fence, the reaction force on the workpiece can be properly balanced and Only held in position. As a result, the operator will not be injured by the over-reaction of the aid workpiece. Furthermore as the workpiece is firmly held by the table fence assembly, the operator does not need to hold it on during the process. Even the workpiece may become hot, the hand of the operator will not be injured Besides, the operator may use his/her hand to spray cooling agent onto the drilling point to smooth the drilling. Besides, then the table fence assembly is attached to the table the retaining groove can be selected such that it is located under the drill bit As a result even the drill bit passes through the workpiece the drill bit will project through the retaining groove and will not damage the top surface of the table.

BRIEF DESCRIPTION OF THE DRAWINGS

In order that the present invention may more readily be understood the following description is given, merely by way of example with reference to the accompanying drawings, in which.

DETAILED DESCRIPTION OF THE PREFERRED EMBODIMENT

Figure 1:
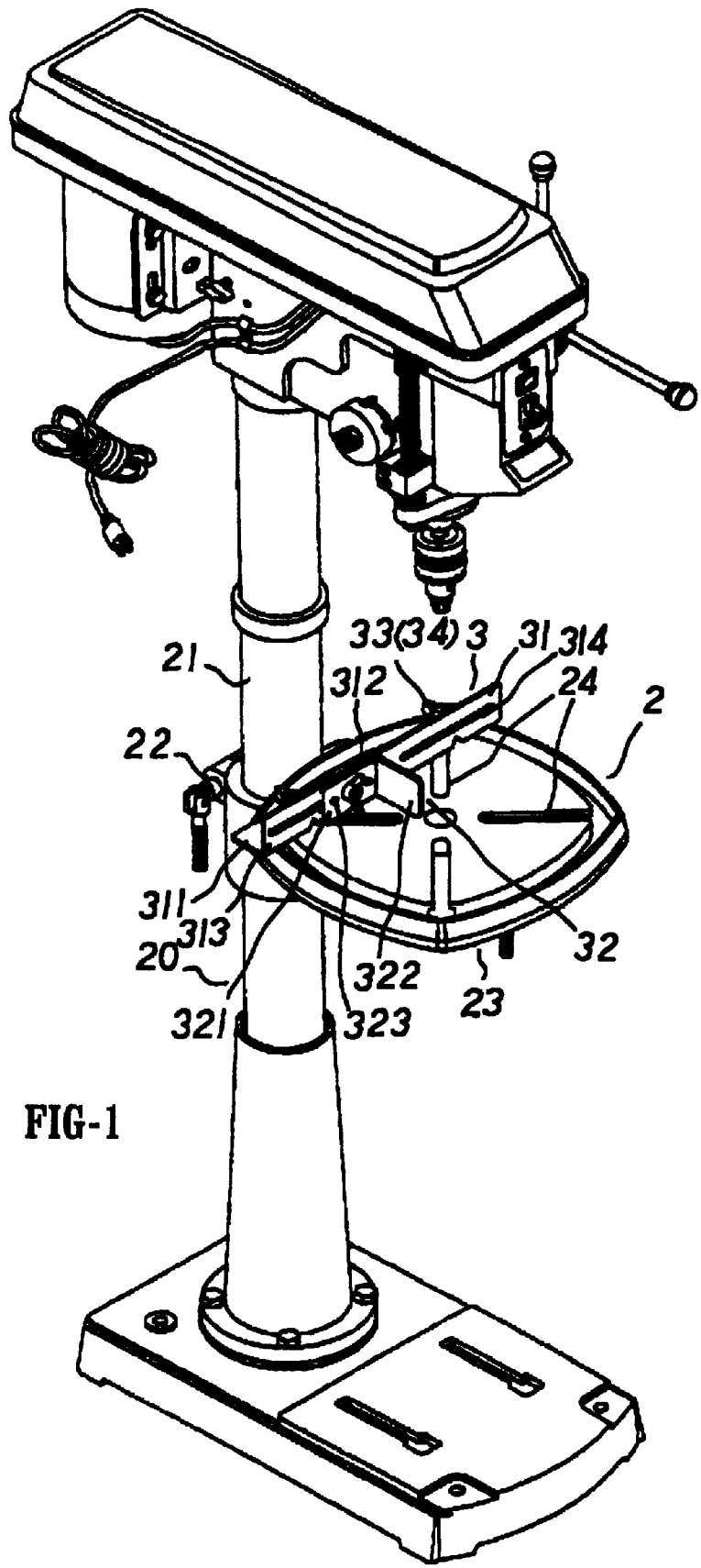
FIG. 1 is a perspective view of a drill press in which the table fence assembly is incorporated thereof.
Figure 2:
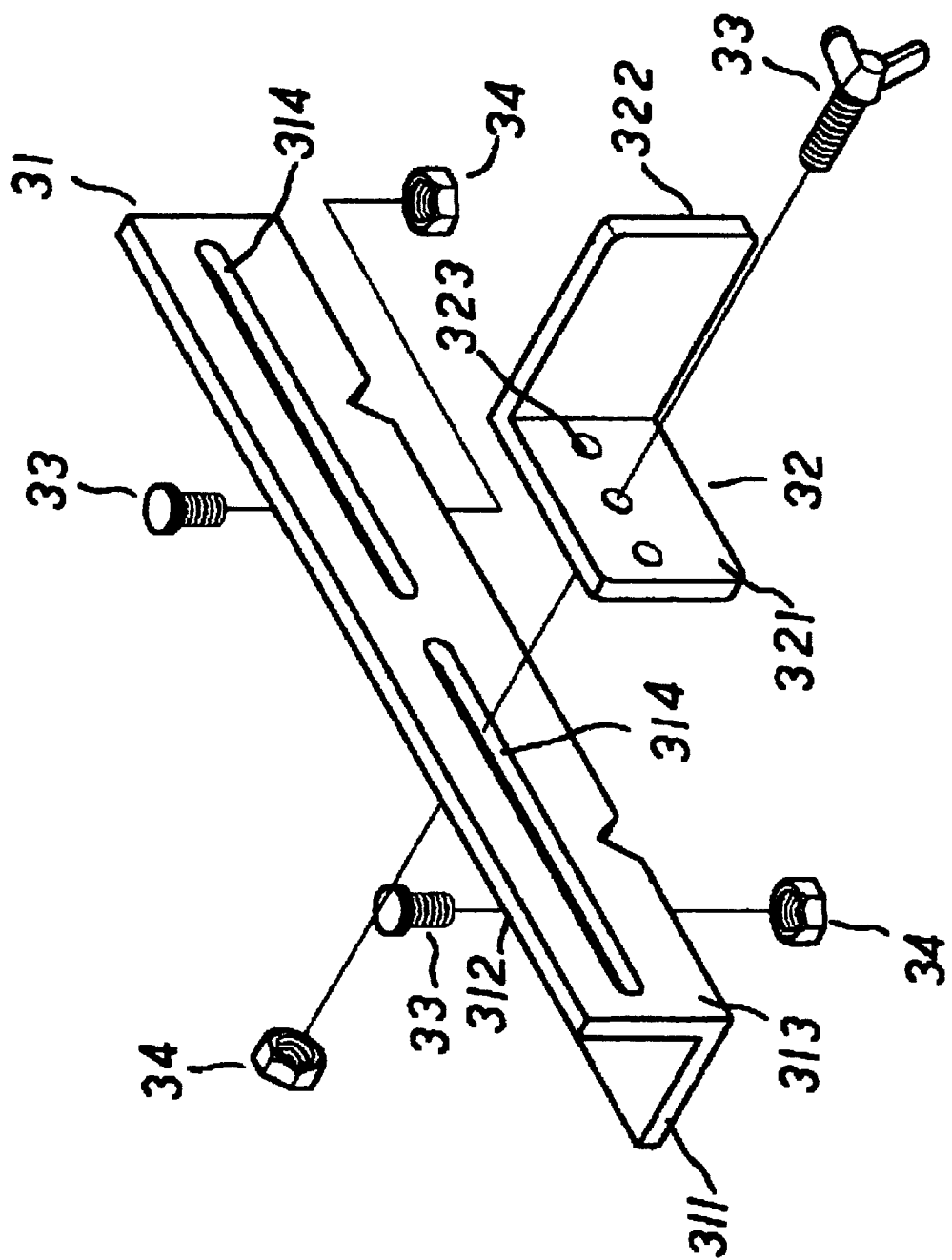
FIG. 2 is an exploded view of the table fence assembly made according to the present invention.

Referring to FIGS. 1 and 2 the table fence assembly that is used to get an accurate drill on the workpiece can be readily mounted onto the table 2 of the drill press 20. The table 2 is rotationally supported onto a column 21 of the drill press 20 and the table 2 can be moved left or right by the help of the table locking clamp 23. The table 2 can be positioned at any position respect to the drill bit of the drill press 20 through the manipulation of the table locking clamp 23. The table 2 is provided with a plurality of retaining grooves 24 that are similar to the conventional drill press 20. The table fence assembly 3 made according to the present invention onto the table 2 via the retaining grooves 24. Accordingly, the machining such as drilling, boring and tapping can be accurately and efficiently performed by the help of the table fence assembly 3.

The table fence assembly 3 generally comprises a rear fence 31, a front fence 32 a plurality of locking bolts 33 and locking nuts 34. The rear fence 31 has an L-shape cross section that includes a horizontal section 311 and a vertical section 313. The sections 311 and 313 are each provided with an elongate hole 312 and 314 respectively. The front fence 32 has also an L-shape cross section that defines a connecting section 321 and a supporting section 322. The supporting section 322 is provided with opening 323 for applying a fastener thereof.

Figure 3:
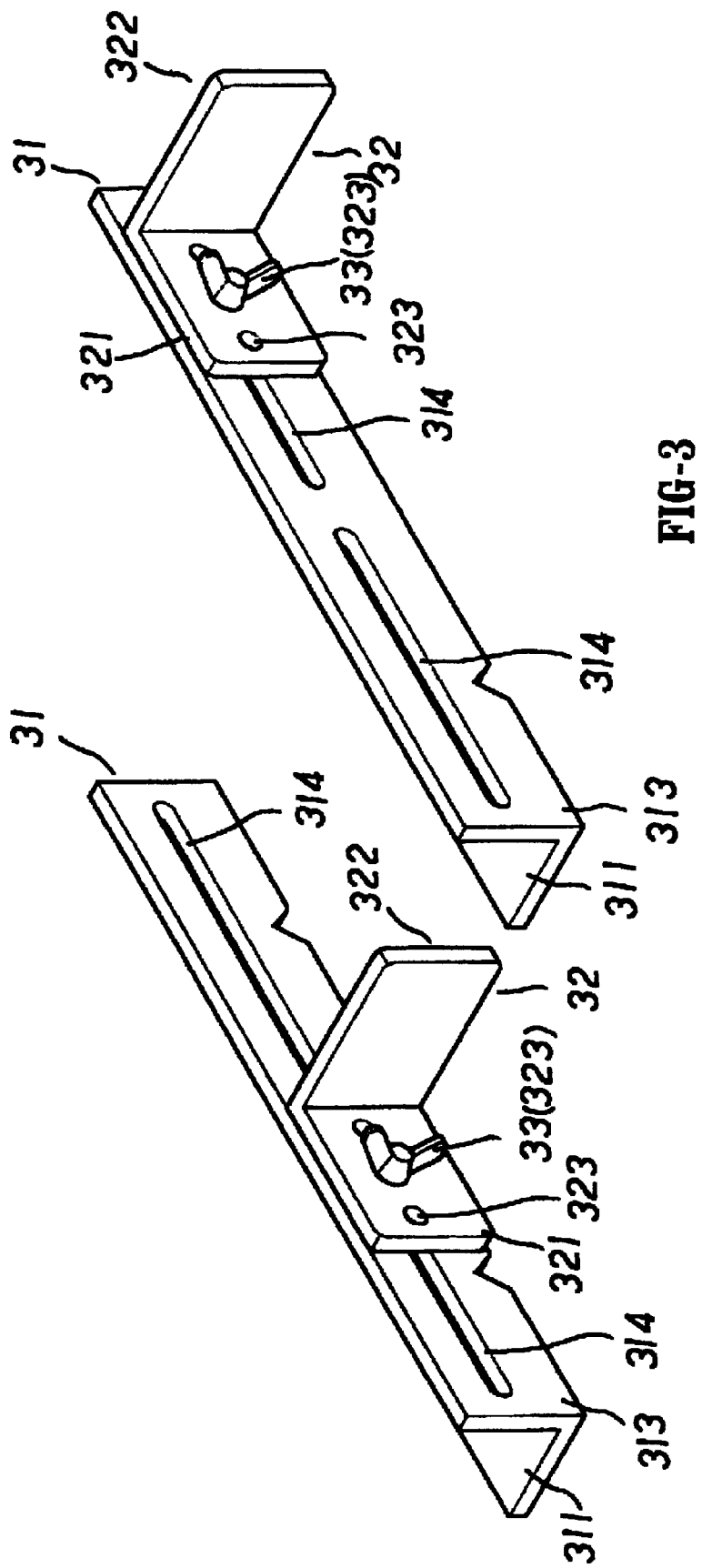
FIG. 3 is a schematic illustration of the table fence assembly shown in FIG. 2.

In use the rear fence 31 is firstly attached to the table 2 by the engagement between the elongate hole 312 of the horizontal section 311 and the elongate hole 24 of the table 2 by means of the locking bolts 33 and nuts 34. Then the front fence 32 can be attached to the vertical section 313 of the rear fence 31 through the engagement between the opening 323 of the connecting section 321 and the elongate hole 314 of the vertical section 313 by means of the locking bolts 33 and nuts 34. A spanner can be used to tightly lock up the nuts 34 and the bolts 33. The front fence 32 can be readily disposed at different position according different requirements from working procedures. FIG. 3 has illustrated two feasible ways.

Figure 4:
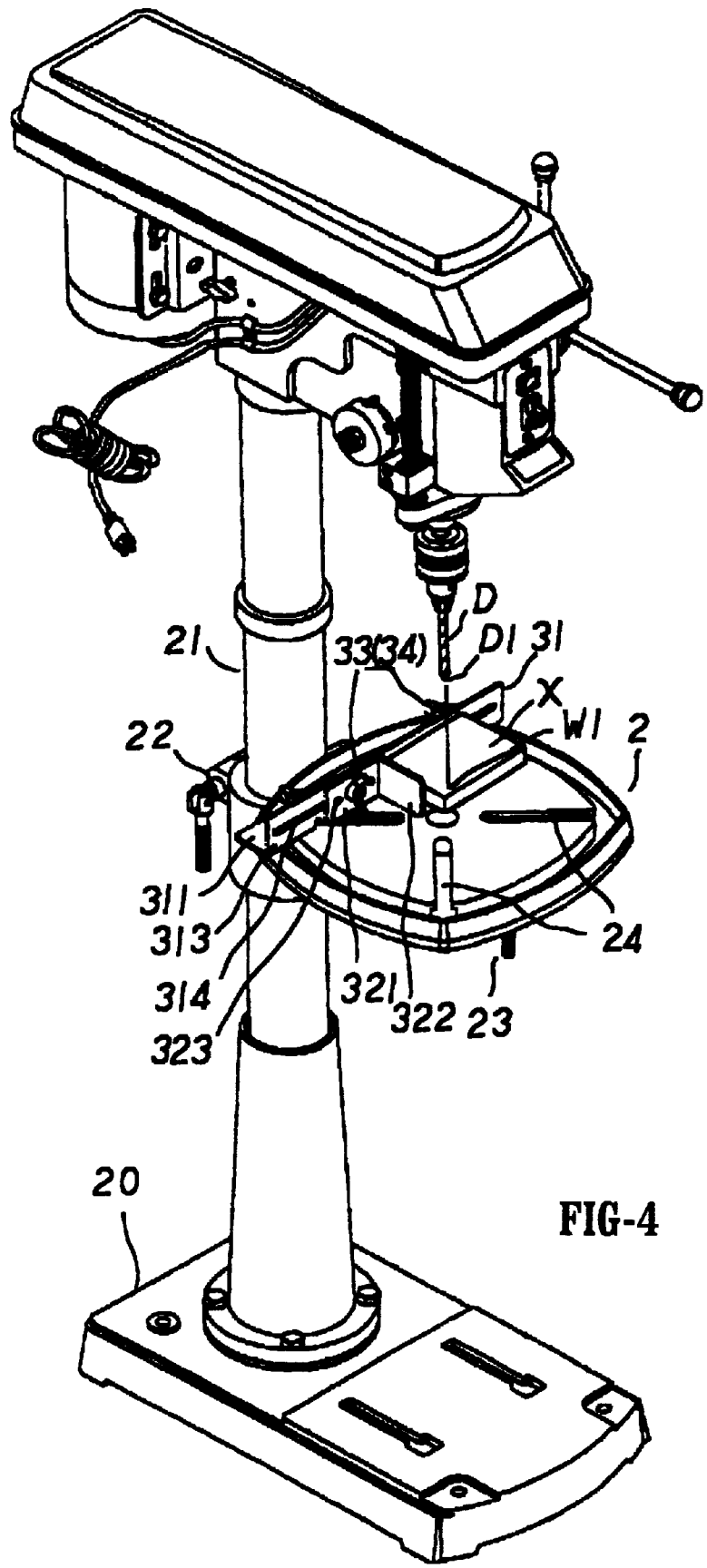
FIG. 4 is a schematic illustration of the drill press in which the workpiece is drilled by the help of the table fence assembly.

In drilling a bore on a workpiece W. the workpiece W is firstly marked with a central point or pilot recess W1 through a puncher. Then the workpiece W can be disposed onto the table 2 in such a manner that the reference side or plane of the workpiece W is in contact with the vertical section 313 of the rear fence 31 and the supporting section 322 of the front fence 32. Then the tip D1 of the drill bit D can be lowered down to make sure whether the tip D is accurately aligned with the pilot recess W1 of the workpiece W. If the tip D1 is not aligned with the pilot recess W1 then the table 2 can be relocated respect to the column 22 by the help of the table locking clamp 23 till the tip D1 is completely aligned with the pilot recess W1 of the workpiece W. Then the drilling process can be commenced as shown in FIG. 4. By this arrangement if a plurality of workpieces are to be drilled in the same position- the process of marking the pilot recess W1 on the workpiece W can be eliminated because once the workpiece W is held by the vertical section 313 and the supporting section 322, the drilling position on every workpiece W will be identical to each other.

By the provision of the vertical section 313 and the supporting section 322, the reaction force on the workpiece W can be properly balanced and firmly held in position. As a result, the operator will not be injured by the over-reaction of the workpiece W. Furthermore, as the workpiece W is firmly held by the table fence assembly 3, the operator does not need to hold it on during the process. Even the workpiece W may become hot the hand of the operator will not be injured. Besides the operator may use his/her hand to spray cooling agent onto the drilling point to smooth the drilling. Besides then the table fence assembly 3 is attached to the table 2 the retaining groove 24 can be selected such that it is located under the drill bit D1. As a result even the drill bit D1 passes through the workpiece W, the drill bit D1 will project through the retaining groove 24 and will not damage the top surface of the table 2.

While particular embodiment of the present invention has been illustrated and described it would be obvious to those skilled in the art that various other changes and modifications can be made without departing from the spirit and scope of the invention. It is therefore intended to cover in the appended claims all such changes and modifications that are within the scope of the present invention.

I claim:

1. A table fence assembly for a drill press of the type that can be installed onto the table of a drill press, said drill press including a column in which said table is rotationally attached thereto by means of a table locking clamp for left or right adjustment thereof, said table including a plurality of retaining grooves, comprising a rear fence having an L-shape cross section that defines a horizontal section and a vertical sections said sections being each provided with an elongate hole, respectively, wherein said rear fence can be attached to said retaining grooves of said table by means of a plurality of locking bolts and nuts that pass through said elongate hole of said horizontal section and said retaining groove of said table; and a front fence having also an L-shape cross section that defines a connecting section and a supporting section said supporting section being provided with at least one opening, wherein said front fence can be attached to said vertical section of said rear fence by means of at least one locking bolt and nut that pass through said at least one opening of said connecting section and said elongate hole of said vertical section of said rear fence.

* * * * *

UNITED STATES PATENT AND TRADEMARK OFFICE
CERTIFICATE OF CORRECTION

PATENT NO. : 5,980,167 Page 1 of 1
APPLICATION NO. : 09/054512
DATED : November 9, 1999
INVENTOR(S) : Cheng It is certified that error appears in the above-identified patent and that said Letters Patent is hereby corrected as shown below:

Title page, item (76) Inventors: Delete "Ruey-Zon Chen" and replace with
--Mei Ling Cheng, No. 28 Lane 451, Leye Road, Taichung City, Taiwan 401--.

Signed and Sealed this

Fifteenth Day of April, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 5,980,167 | Page 1 of 1 |
| APPLICATION NO. | : 09/054512 | |
| DATED | : November 9, 1999 | |
| INVENTOR(S) | : Mei Ling Cheng | |

It is certified that error appears in the above-identified patent and that said Letters Patent is hereby corrected as shown below:

Title Page, Item (57) - ABSTRACT
In the last sentence of the Abstract, please delete "supporting" and insert therefor --connecting--.

Column 1,
 Lines 22-23, please delete the second instance of "supporting" and insert therefor --connecting--.

Column 2,
 Line 28, please delete "supporting" and insert therefor --connecting--.

Column 3,
 Line 43, please delete "supporting section 322" and insert therefor --connecting section 321--.

Column 4,
 Claim 1, line 56, please delete "supporting" and insert therefor --connecting--.

Signed and Sealed this

Thirteenth Day of May, 2008

JON W. DUDAS
*Director of the United States Patent and Trademark Office*